United States Patent
Jain et al.

(10) Patent No.: US 12,231,331 B2
(45) Date of Patent: Feb. 18, 2025

(54) SPANNING TREE LEARNING IN A NETWORK DEVICE

(71) Applicant: Arista Networks, Inc., Santa Clara, CA (US)

(72) Inventors: Apeksha Jain, Nashua, NH (US); Victor Wen, San Jose, CA (US); Daniel Robert Guerin, Litchfield, NH (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 413 days.

(21) Appl. No.: 17/858,299

(22) Filed: Jul. 6, 2022

(65) Prior Publication Data

US 2024/0015100 A1   Jan. 11, 2024

(51) Int. Cl.
| | | |
|---|---|---|
| *H04L 45/48* | (2022.01) | |
| *G06F 8/65* | (2018.01) | |
| *H04L 12/46* | (2006.01) | |
| *H04L 41/12* | (2022.01) | |

(52) U.S. Cl.
CPC ............ *H04L 45/48* (2013.01); *G06F 8/65* (2013.01); *H04L 12/462* (2013.01); *H04L 41/12* (2013.01)

(58) Field of Classification Search
CPC ....... H04L 45/48; H04L 12/462; H04L 41/12; G06F 8/65
See application file for complete search history.

(56) References Cited

U.S. PATENT DOCUMENTS

| | | | |
|---|---|---|---|
| 7,177,946 B1 * | 2/2007 | Kaluve | H04L 45/48 370/256 |
| 2007/0159988 A1 | 7/2007 | Khan et al. | |
| 2010/0039961 A1 * | 2/2010 | Tallet | H04L 12/462 370/256 |

OTHER PUBLICATIONS

European Patent Office, Extended European Search Report issued in EP Application No. 23180885.8, dated Oct. 25, 2023, 8 pgs.

* cited by examiner

*Primary Examiner* — Duc C Ho

(74) *Attorney, Agent, or Firm* — Fountainhead Law Group, PC

(57) ABSTRACT

Starting a spanning tree protocol (STP) process in a network device excludes performing a root bridge election sequence. The network device receives and learns the STP roles and STP states of its ports based on the received bridge protocol data units (BPDUs) during a quiescent period of time subsequent to starting STP processing. Port role and port state learning occur absent the generation and transmission of BPDUs during the quiescent period of time. Subsequent to the end of the quiescent period, the network device commences generating and transmitting BPDUs.

20 Claims, 6 Drawing Sheets

SPANNING TREE LEARNING IN A NETWORK DEVICE

BACKGROUND

Spanning Tree Protocol (STP) is a Layer 2 (L2) network protocol that ensures a loop-free topology for any bridged Ethernet Local Area Network (LAN). STP allows a network to include spare links as automatic backup paths that are available when an active link fails without creating loops or requiring manual intervention. The original STP is standardized as Institute of Electronics and Electrical Engineers (IEEE) 802.1D.

A spanning-tree protocol defines a tree topology called a spanning tree in a bridged network in which one network device (e.g., switch) is designated the root bridge. A characteristic of the spanning tree is that there is only one path from the root bridge to each non-root bridge. In the context of a data network, a spanning tree avoids flood loops that can result in broadcast storms.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure is directed to the Spanning Tree Protocol (STP), and in particular to hitless STP learning in a network device during a control plane software upgrade on the network device. Conventionally, when a software update is performed, the network device running STP will begin transmitting bridge protocol data units (BPDUs) as the control plane is booting up in the network device. Because the control plane has been rebooted, the BPDUs will be inconsistent with the current spanning tree. When these BPDUs are transmitted to other network devices, they can cause STP to recompute the spanning tree resulting in disruption of network traffic.

In accordance with the present disclosure, when the control plane in a network device (referred to herein as a "bridge") boots up after a software upgrade, the bridge will perform various startup activities, including initiating STP processing. With respect to STP processing, the bridge enters a quiescent period during which time the bridge can learn its port roles and port states based on received BPDUs. In addition, BPDUs are not transmitted during the quiescent period. In some embodiments, for example, the bridge can establish a quiescent period by initiating a timer (e.g., 20 seconds). During the quiescent period, the bridge will receive and process BPDUs from other bridges to which it is connected. Using information in the received BPDUs, the bridge can compute or otherwise determine the roles and states of its ports. In addition, the bridge will not generate and transmit BPDUs during the quiescent period so as to avoid causing the network to recompute the spanning tree. As discussed below, after expiration of the timer, if the STP topology has not changed during the upgrade, then the upgrade will be hitless. On the other hand, if the topology changes during the upgrade, a transmit port may be detected which can result in the bridge transmitting BPDUs in which case the upgrade may not be hitless.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
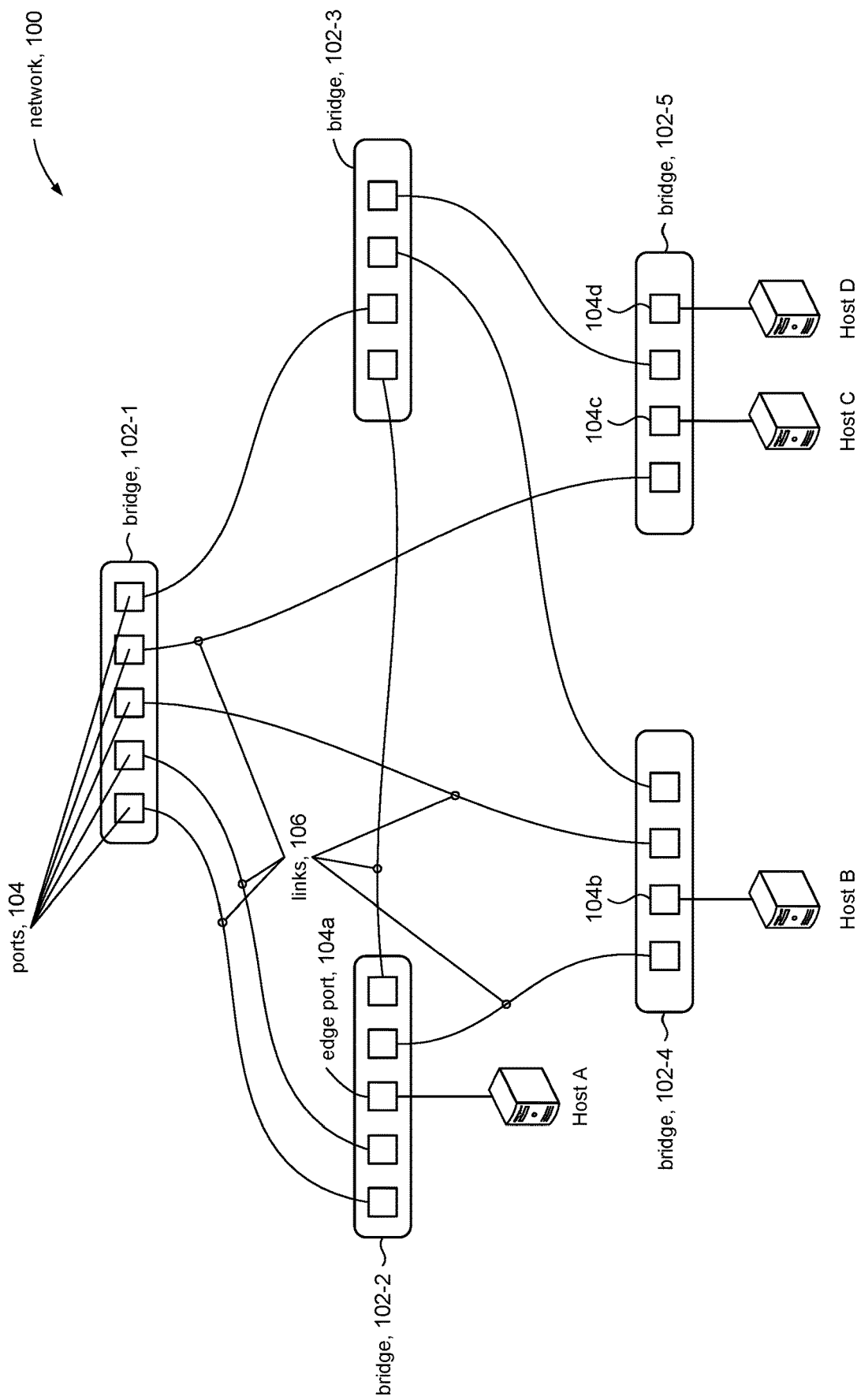
FIG. 1 shows an illustrative network deployment to describe aspects of the present disclosure.

FIG. 1 shows a network deployment 100 to provide communication between endpoint computing devices, such as user computers, servers, routers, hubs, and the like, which are generally represented in the figure as host machines, Host A, Host B, Host C, Host D. Network deployment 100 comprises network devices such as bridges and switches, collectively referred to herein as bridges 102, to which the devices are connected. Bridges 102 include physical interface ports 104 that can be individually configured to receive electrical cables or fiber optic cables, collectively referred to herein as links 106, to connect to other bridges or devices. Ports on a bridge that are connected to endpoint computing devices can be referred to as edge ports; this aspect of the present disclosure is discussed below. For example, port 104a on bridge 102-2 can be referred to as an edge port because it is connected to Host A. Likewise, port 104b on bridge 102-4 can be referred to as an edge port, and bridge 102-5 includes edge ports 104c, 104d connected to Host C and Host D, respectively. Links 106 interconnect bridges 102 to form a network of bridges.

Networks such as network deployment 100 are often configured with redundant paths to protect against device failures and link failures. For example, bridge 102-2 can reach bridge 102-3 by any of a number of paths. These redundant paths can lead to the formation of loops where data travels from a source to a destination along redundant paths and the data begins to circle around the same paths, becoming amplified and resulting in a broadcast storm.

To avoid the formation of loops, the Institute of Electronics and Electrical Engineers (IEEE) set forth the IEEE 802.1D standard which defines the Spanning Tree Protocol (STP) for building a loop-free topology in a network. Briefly, STP defines messages called bridge protocol data units (BPDUs) that are exchanged between the bridges in the network. The BPDUs allow bridges to calculate or otherwise learn a subset of the network that is loop-free, called a spanning tree. The spanning tree describes the port role (root, designated, backup, etc.) and port state (forwarding, blocking, etc.) of each port in each bridge in the network. A BPDU packet contains information about the sender of the packet and is used to compute and maintain a spanning tree in accordance with the 802.1D.

Figure 2:
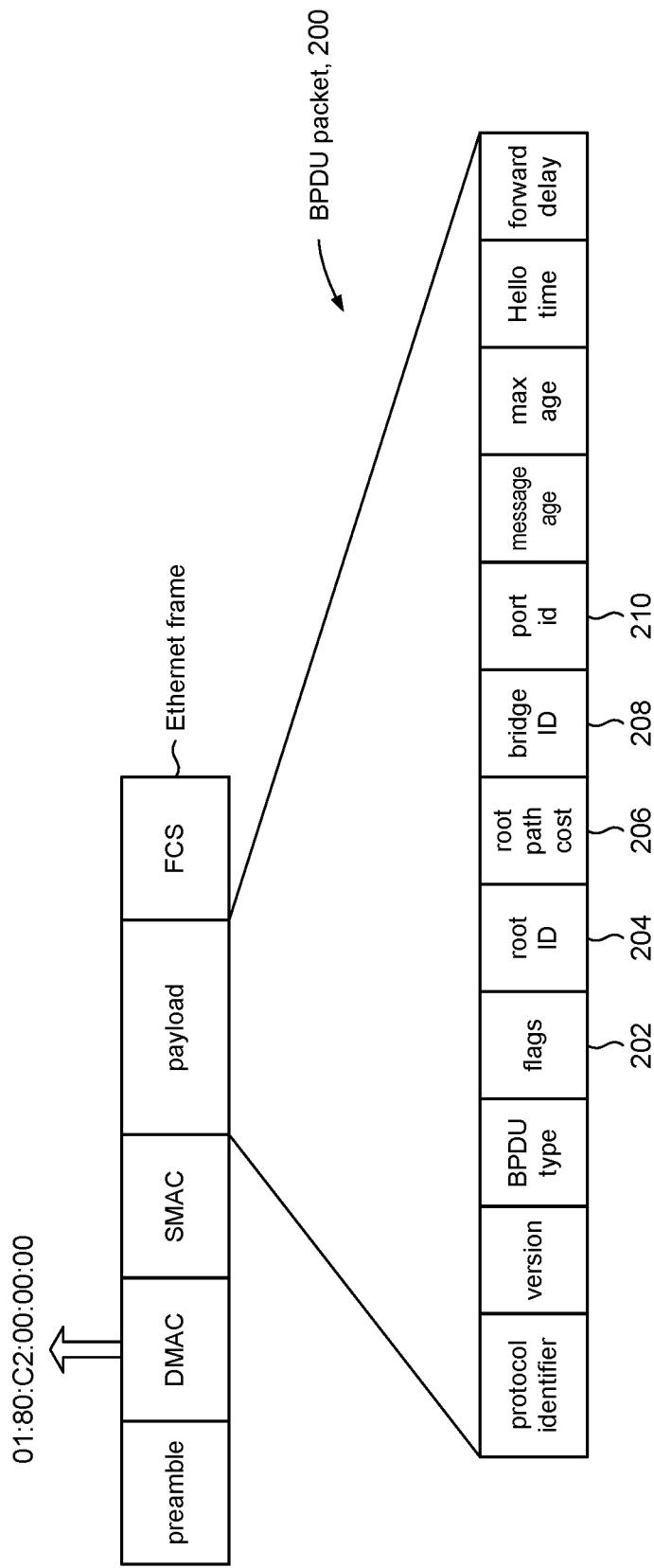
FIG. 2 shows a format of a bridge protocol data unit.

FIG. 2 shows the format of a BPDU packet 200. BPDU packets are transmitted in Ethernet frames having a destination Media Access Control (DMAC) address of 01:80:C2: 00:00:00, which is a multicast address for the spanning tree group. When a bridge receives a frame that is addressed with this DMAC address, the bridge will access the BPDU packet in the frame. BPDU packet 200 comprises various data fields including a flags data field, 202, a root ID data field 204, a root path cost data field 206, a bridge ID data field 208, and port ID data field 210. The flags data field 202 is an 8-bit field that includes a 1-bit Topology Change (TC) flag and a 1-bit Topology Change Acknowledge (TCA) flag. The root ID data field 204 contains the identifier of the bridge that is assumed to be the root. The root path cost data field 206 contains a value that represents the cost to reach the root from the port on which the BPDU is sent. The bridge ID data field 208 contains the identifier of the bridge that sends the BPDU packet. The port ID data field 210 contains an identifier of the port on which the BPDU is sent.

Figure 3:
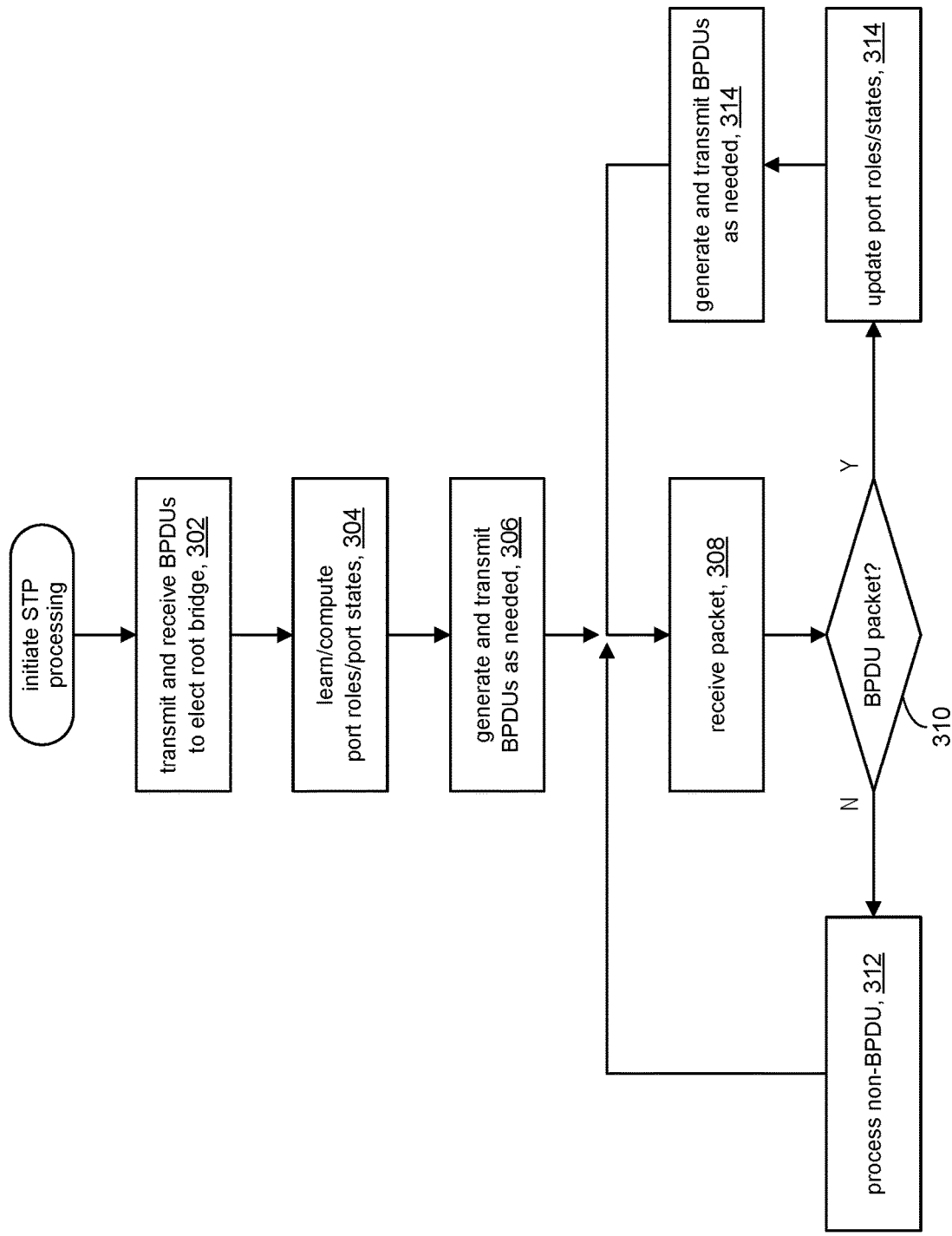
FIG. 3 shows conventional STP processing.
Figure 4:
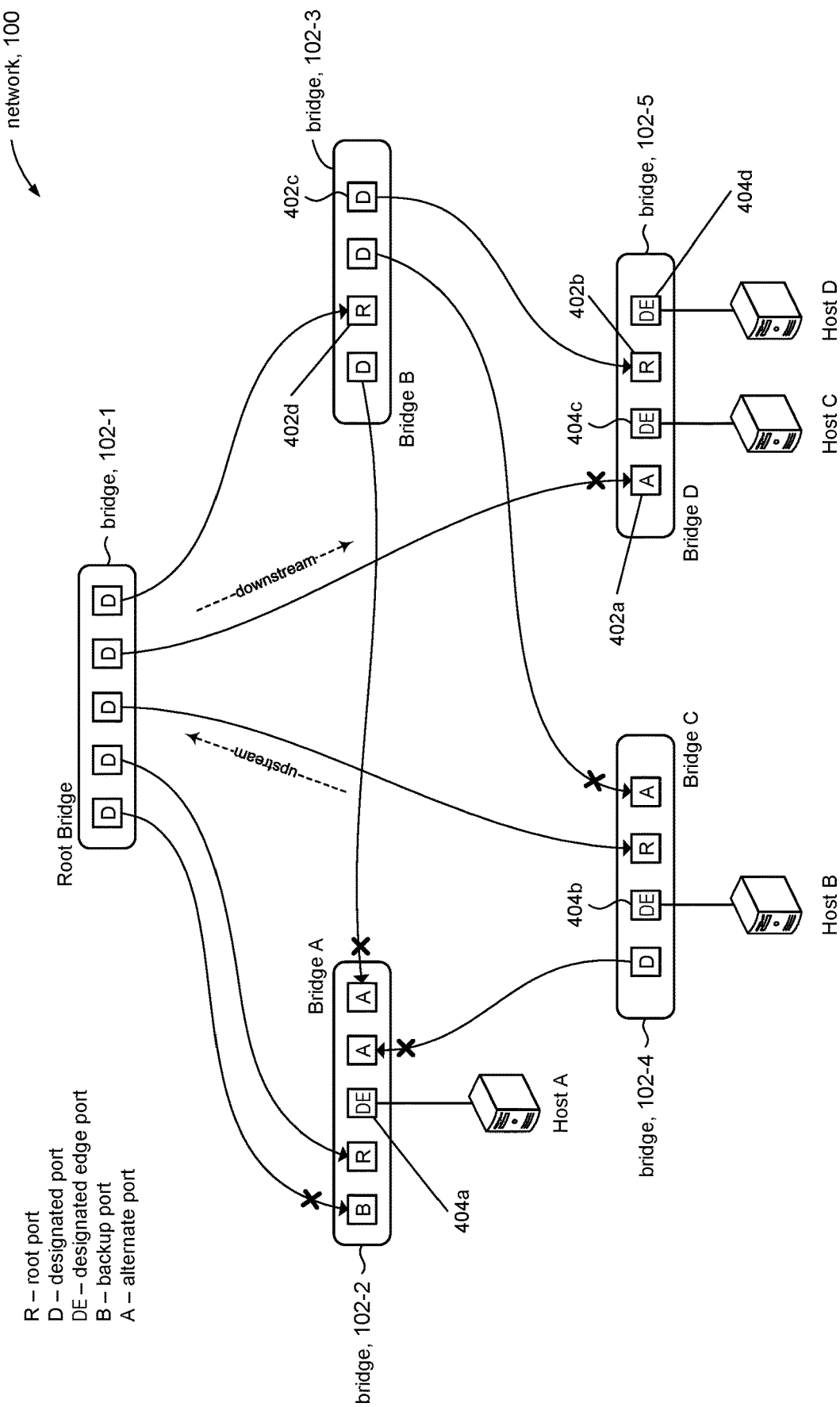
FIG. 4 shows an example of a spanning tree configuration.

Referring to FIGS. 3 and 4, the discussion will now turn to a high level description of typical STP processing when a bridge (e.g., bridge 102-2, FIG. 1) first starts up. For discussion purposes, the term "subject bridge" will refer to the bridge whose operations are the subject of FIG. 3 and described below. It is understood that the operations are performed by each bridge in the network. The following description generally applies to STP and Rapid STP (RSTP).

At block 302, the subject bridge engages in electing a root bridge. At startup, the port roles and port states for the ports have not yet been determined. STP port roles include:

Root port—This is the port that is "closest" to the root bridge in that the port has the lowest path cost from the bridge to the root. The bridge has one root port.

Designated port—This is a port that forwards traffic away from the root bridge toward a leaf. The bridge can have more than one designated port.

Alternate port—This is a port that serves as an alternate to the root port.

Backup port—This is a port that serves as a backup to a designated port.

STP Port States Include:

Discarding—A port in this state discards all traffic.

Learning—A port in this state builds its MAC address table based on information contained in received frames.

Forwarding—A port in this state filters and forwards all traffic.

Accordingly, in accordance with conventional STP processing, the subject bridge can transmit and receive BPDUs with other bridges to elect a root bridge. For example, the subject bridge can assert that it is the root bridge by transmitting, on all of its ports to the other bridges, BPDUs with the root ID field set to its identifier and the root path cost set to zero. Likewise, the subject bridge can receive, on its ports from other bridges, BPDUs asserting they are the root. The subject bridge will compare its ID against the root ID of a BPDU received from a given bridge and transmit on its ports a new BPDU with a root ID containing the smaller of the two IDs. The subject bridge does this for each received BPDU. The other bridges in the deployment also perform this comparison and retransmission, and in this way the root bridge is eventually elected. The non-root bridges can be referred to as "designated" bridges.

At block 304, when the root bridge has been elected, the subject bridge can continue exchanging (transmitting and receiving) BPDU packets to learn or otherwise compute the roles and states of its ports. For example, the port that is closest to the root (i.e., having the lowest path cost to the root) is assigned the role of the "root port." The root port is the only port on the subject bridge that receives and forwards frames from and to the root bridge. The remaining ports on the subject bridge take on the role of designated port, backup port, or alternate port depending on characteristics of the port. The root port and designated ports are placed in a forwarding state so that traffic can be forwarded to and from the ports and thus onto the corresponding paths or links. Ports other than the root port or designated port are placed in a discarding state. The subject bridge will not forward any traffic on a port that is in the discarding state.

Referring to FIG. 4 for a moment, the figure shows an illustrative example of a spanning tree that may result by running STP on the network deployment of FIG. 1. The arrowheads on the links emphasize the direction of BPDU packet flow; BPDU packets flow from the root bridge toward the designated bridges. The example shows that bridge 102-1 has been elected Root Bridge with the remaining bridges being designated bridges. The example further shows computer port roles for each bridge. For example, on Bridge D (bridge 102-5), port 402b is deemed to have the lowest path cost to the root bridge (bridge 102-1) as compared to port 402a, and so port 402b is given the role of root port. Furthermore, in accordance with STP, the port at the other end of the link to which root port 402b is connected, namely port 402c on Bridge B, is assigned the role of designated port.

FIG. 4 further illustrates that edge ports 404a, 404b, 404c, 404d have been assigned the role of designated edge port. An edge port is a port that is connected to a device (e.g., host computer) that does not process STP. A designated edge port will nonetheless transmit BPDUs to such devices; however, the device receiving the BPDUs will not process them. Moreover, such devices will not transmit BPDUs. Although not described herein, it is understood that STP also provides for assigning the roles of backup port and alternate port.

At block 306, the subject bridge can generate and transmit one or more BPDU packets as needed. For example, per STP processing, the subject bridge can generate and transmit BPDUs on its designated ports every two seconds (the Hello timer). The subject bridge can transmit BPDUs in response to detecting certain configuration changes on the switch (e.g., ports coming up/going down, interface costs or priorities changing, bridge priority changing, etc.). The subject bridge can transmit BPDUs in response to receiving a BPDU that indicates a change elsewhere in the network.

At block 308, the subject bridge can receive a packet for processing. More specifically, in some embodiments, the subject bridge can receive an Ethernet frame that contains a packet. Any port on the subject bridge may receive normal (non-STP) traffic. With respect to STP traffic, the root port on the subject bridge can receive frames containing BPDU packets sent by the upstream root bridge. A designated port on the subject bridge can receive BPDU packets from a downstream designated bridge. Referring for example to FIG. 4, Bridge D can transmit a frame containing a BPDU packet to the root bridge on its root port 402b, where it is received on designated port 402c of Bridge B. Bridge B, in turn, can forward the BPDU packet to the root bridge on its root port 402d.

At decision point 310, if the received packet is not a BPDU packet (i.e., non-STP traffic), then processing can continue at block 312. If the received packet is a BPDU packet (i.e., STP traffic), then processing can continue at block 314. As noted above, BPDU packets are transmitted in frames having the reserved DMAC address of 01:80:C2:00:

00:00. Accordingly, in some embodiments, a BPDU packet can be detected based on the DMAC address in a received Ethernet frame.

At block 312, the received packet is deemed to be a non-BPDU packet. In some embodiments, the subject bridge device can process a non-BPDU packet. For example, the subject bridge can apply filters (e.g., forwarding table lookups) to determine how to process/forward received packet; e.g., drop the packet, rewrite the packet, log information about the packet, forward the packet, flood the packet, and so on. Processing can return to block 306 to receive and process the next packet.

At block 314, the subject bridge can update the role (root, designated, blocked, etc.) and/or state (forwarding, discarding, etc.) of one or more of its ports according to the received BPDU packet.

At block 316, the subject bridge can generate and transmit one or more BPDU packets as needed. Illustrative examples are mentioned above at block 306. Processing can return to block 306 to receive and process the next packet.

Figure 5:
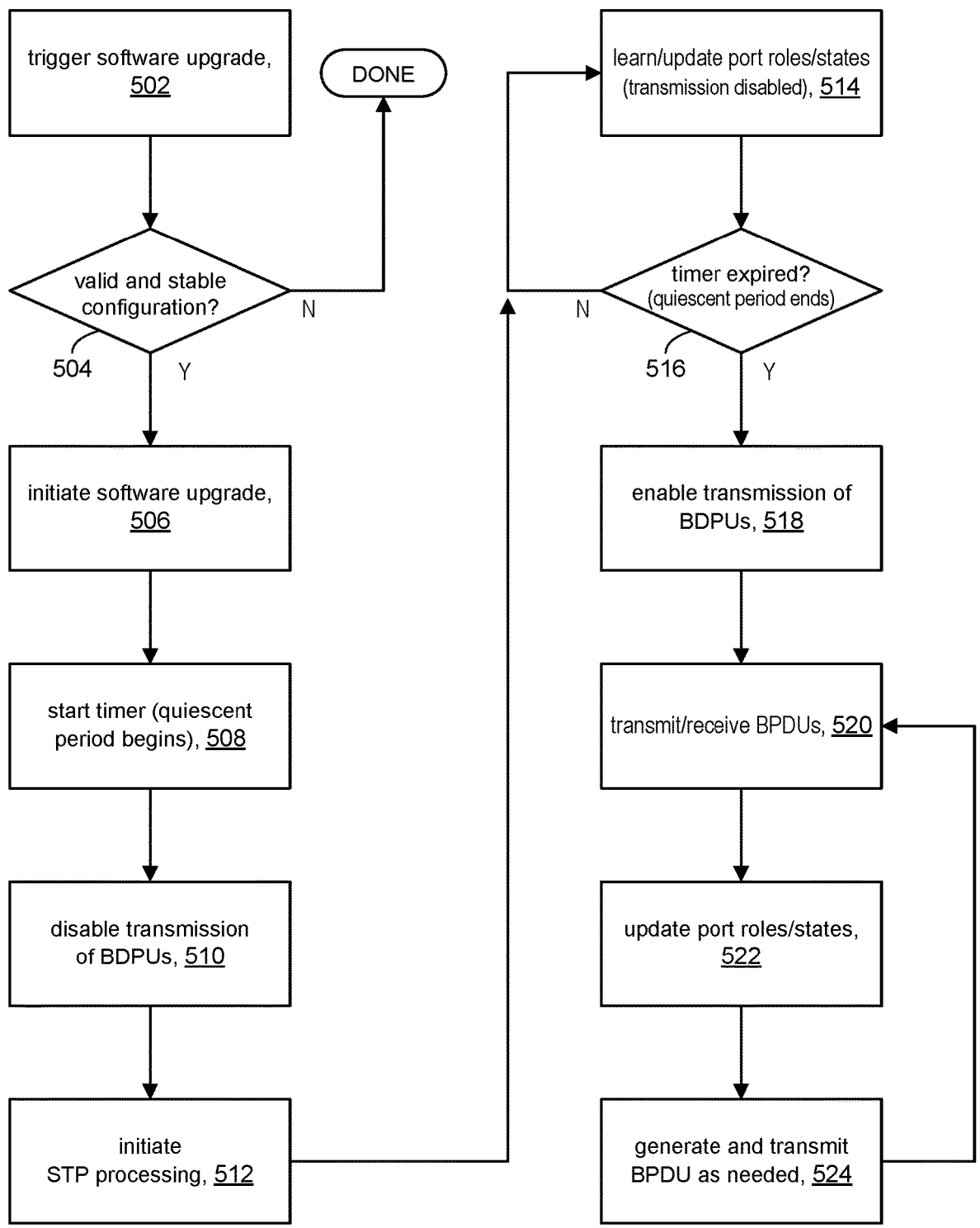
FIG. 5 shows STP processing in accordance with the present disclosure.

Referring to FIG. 5, the discussion will now turn to a high-level description of STP processing in a network device (e.g., bridge 102-2, FIG. 1) in accordance with the present disclosure, and in particular to a description of STP processing during a software update of the control plane in the network device. In some embodiments, for example, the network device can include one or more digital processing units, which when operated, can cause the network device to perform processing in accordance with FIG. 5. Digital processing units can include general CPUs in the control plane that operate by way of executing computer program code stored on a non-volatile computer readable storage medium (e.g., read-only memory); for example, CPU 608a in the control plane, FIG. 6 can be a general CPU. The term "bridge" is typically used when describing STP, and so this term will be used in place of "network device" to emphasize the STP context of the present disclosure. For discussion purposes, the operations shown in FIG. are performed by the "subject bridge" with the understanding that the operations can be performed by other bridges in the network. The following discussion generally applies to STP and RSTP.

At block 502, the subject bridge can trigger a software upgrade of the control plane. In some embodiments, for example, a software upgrade can be initiated by a network administrator. In other embodiments, the software upgrade can be initiated by an automated process, for example, from a network management system. In general, a software upgrade operates to replace software components in the control plane of a bridge, and as such involves a reboot of the processor(s) and a restart of processes executing in the control plane. Because the memory in the control plane is generally cleared, information (e.g., port roles and states) pertaining to the current spanning tree is likely to be lost and needs to be re-computed.

At decision point 504, before proceeding with the upgrade, the subject bridge can determine whether it is in a valid operating state. In some embodiments, for example, a software upgrade can be permitted based on the current operational states of the ports on the subject bridge. In some embodiments, for example, a prerequisite (valid) operational state of the ports for proceeding with the software upgrade can be that each port on the subject bridge:

is assigned the role of root port (e.g., port 402d, FIG. 4) or an alternate port (e.g., port 402a, FIG. 4)—these ports only receive BPDU packets; OR is assigned the role of alternate port in the discarding state; OR is an edge port that is assigned the role of designated port (e.g., port 404A, FIG. 4); OR is assigned the role of a backup in the discarding state.

If the subject bridge has a port that is not in one of the above operational states, the subject bridge can deny the software upgrade; the upgrade can be terminated. It will be appreciated that in some embodiments, a warning message may be generated rather than terminating the upgrade process for certain conditions. For example, if STP is unstable (see below), a warning message may be generated to give the user the option to proceed or not.

If the perquisite port operating states are met, then a determination can be made whether STP is stable. In some embodiments, STP can be deemed "stable" if the ports on the subject bridge have not changed their roles (root, designated, blocked, etc.) or states (forwarding, discarding, etc.) for a user-specified period of time, e.g., one minute, two minutes, etc. If STP is deemed to be unstable, the software upgrade can be terminated. If STP is deemed to be stable, then the software upgrade can proceed at block 506.

At block 506, the subject bridge can initiate the software upgrade. In some embodiments, for example, the processors in the control plane of the subject bridge can be rebooted and various processes or agents can be restarted. In some embodiments, because the upgrade involves only the control plane, the data plane component of the subject bridge is unaffected and remains operational so that network traffic can continue to receive and process network traffic uninterrupted while the control plane is upgraded. Depending on the nature of the software upgrade, the remaining operations in FIG. 5 may or may not complete before the software upgrade process completes.

At block 508, the subject bridge can initiate a quiescent timer for a period of time; e.g., on the order of tens of seconds. In accordance with the present disclosure, the quiescent timer marks the beginning of a quiescent period during which time the subject bridge can learn the roles and states of its ports. The subject bridge can process BPDU packets received from its neighbors and gain knowledge of (compute, learn) the current spanning tree based on information contained in the received BPDUs.

At block 510, the subject bridge can disable the transmission of BPDUs during the quiescent period. In some embodiments, for example, a transmission flag or other suitable mechanism can be used to indicate to an STP process that transmission of BPDUs is permitted (e.g., flag is set to logic '1') or is not permitted (e.g., flag is set to logic '0'). Accordingly, in some embodiments, the transmission flag can be set to logic '0' to disable transmission of BPDUs.

At block 512, the subject bridge can initiate STP processing during the quiescent period. In some embodiments, for example, the subject bridge can instantiate an STP agent to perform STP processing. In accordance with the present disclosure, the subject bridge does not transmit BPDUs during the quiescent period; e.g., by virtue of the above-mentioned transmission flag being set to logic '0'. Accordingly, when the subject bridge initiates STP processing (e.g., by instantiating an STP agent) at startup, the subject bridge does not exchange (transmit and receive) BPDUs to elect a root bridge. In other words, the subject bridge in accordance with the present disclosure does not initiate a root election sequence when it initiates STP processing, as would occur in standard STP processing (see FIG. 3 for instance).

At block 514, the subject bridge (e.g., via an STP agent) can learn and update the STP roles and STP states for its ports, without having first performed the root bridge election sequence. During the quiescent period, the subject bridge processes BPDUs received on its ports to learn (set) port roles and/or port states based on the received BPDUs, including learning which bridge is the root bridge and updating previously learned port roles and/or port states.

In accordance with the present disclosure, the subject bridge will not generate BPDUs for transmission during the quiescent period. In contrast, conventional STP processing does not have a quiescent period. For example, whereas in conventional STP processing a bridge at startup will generate and transmit BPDUs (e.g., to run a root election sequence), STP processing in accordance with the present disclosure omits generating BPDUs for transmission at startup during the quiescent period.

Because the subject bridge has been rebooted, its port roles and states will be cleared at startup. Accordingly, any BPDUs transmitted by the subject bridge would be inconsistent with the current spanning tree. As such, the transmission of such BPDUs may invoke recomputation of the spanning tree in the other bridges, which can disrupt network traffic. By disabling the transmission of BPDUs at startup for a period of time (quiescent period), the risk of disrupting network traffic due to STP recomputation can be reduced, at least during the quiescent period while subject bridge learns its port roles and port states for the current spanning tree. As noted above, however, regular, non-BPDU traffic continues to be processed in the data plane according to the forwarding tables in the data plane, including transmitting non-BPDU packets on its ports.

At decision point 516, if the quiescent timer has not expired, then the subject bridge can return to block 514 to continue receiving BPDUs and learning/updating its port roles and/or states based on the received BPDUs. Otherwise, if the quiescent timer has expired, the subject bridge can continue processing at block 518; expiration of the quiescent timer marks the end of the quiescent period.

At block 518, the subject bridge can enable the transmission of BPDUs at a time subsequent to the end of the quiescent period. As noted above, in some embodiments, a transmission flag or other suitable mechanism can be used to indicate to the STP agent that transmission of BPDUs is permitted (e.g., flag is set to logic '1') or is not permitted (e.g., flag is set to logic '0'). Accordingly, the transmission flag can be set to logic '1' to re-enable transmission of BPDUs. After the quiescent period has terminated, conventional STP processing of BPDU packets can begin.

At block 520, the subject bridge can continue to receive BPDUs. In some situations, the subject bridge can generate and transmit BPDUs independently of receiving BPDUs.

At block 522, the subject bridge can update the role (root, designated, blocked, etc.) and/or state (forwarding, discarding, etc.) of one or more of its ports according to the received BPDU packet.

At block 524, the subject bridge can generate and transmit one or more BPDU packets as needed. For example, the subject bridge can transmit BPDUs in response to detecting certain configuration changes on the switch (e.g., ports coming up/going down, interface costs or priorities changing, bridge priority changing, etc.). The subject bridge can transmit BPDUs in response to receiving a BPDU that indicates a change elsewhere in the network. Processing can return to block 520 to receive and process BPDU packets pursuant to STP.

There are two scenarios during a software upgrade process in accordance with the present disclosure: the STP topology does not change (scenario 1) during the upgrade process; the STP topology does change (scenario 2) during the upgrade process. In both cases, the subject bridge will converge to a valid spanning tree.

Scenario 1, STP Topology does not Change

In the case of scenario 1, where the topology does not change during the software upgrade, the subject bridge will learn the same spanning tree during the upgrade as was before the upgrade. Because the control plane is rebooted, any BPDUs transmitted by the subject bridge at startup would be inconsistent with the current spanning tree. By disabling BPDU transmissions during the quiescent period while the subject bridge recomputes its port roles and states, the subject bridge will not transmit any BPDUs that may be inconsistent with the current spanning tree and so avoids invoking recomputation of the spanning tree in the other bridges and the disruption to network traffic that can result from such recomputation activity. Because we can avoid invoking STP recomputation during the upgrade, this scenario can be referred to as a "hitless" upgrade.

Scenario 2, STP Topology does Change

In the case of scenario 2, where the topology does change during the software upgrade (e.g., if an edge port becomes a designated port), the subject bridge will compute a new spanning tree from its neighbors during the quiescent period, as described above. However, the spanning tree that is computed will be different from the spanning tree known before the upgrade by virtue of the change in topology. Any further convergence will be taken care of by the standard STP protocol handling. If the subject bridge transmits a BPDU after the quiescent period, the BPDU may be inconsistent with the spanning tree that existed prior to the software upgrade. Accordingly, the inconsistent BPDU may invoke a recomputation of the spanning tree and disrupt network traffic. This scenario can be referred to as a "hitfull" upgrade.

It can be appreciated that while a hitfull upgrade may not be avoidable in situations where the STP topology changes during the upgrade, software upgrades in accordance with the present disclosure can be hitless in those situations where the STP topology does not change during the upgrade.

Figure 6:
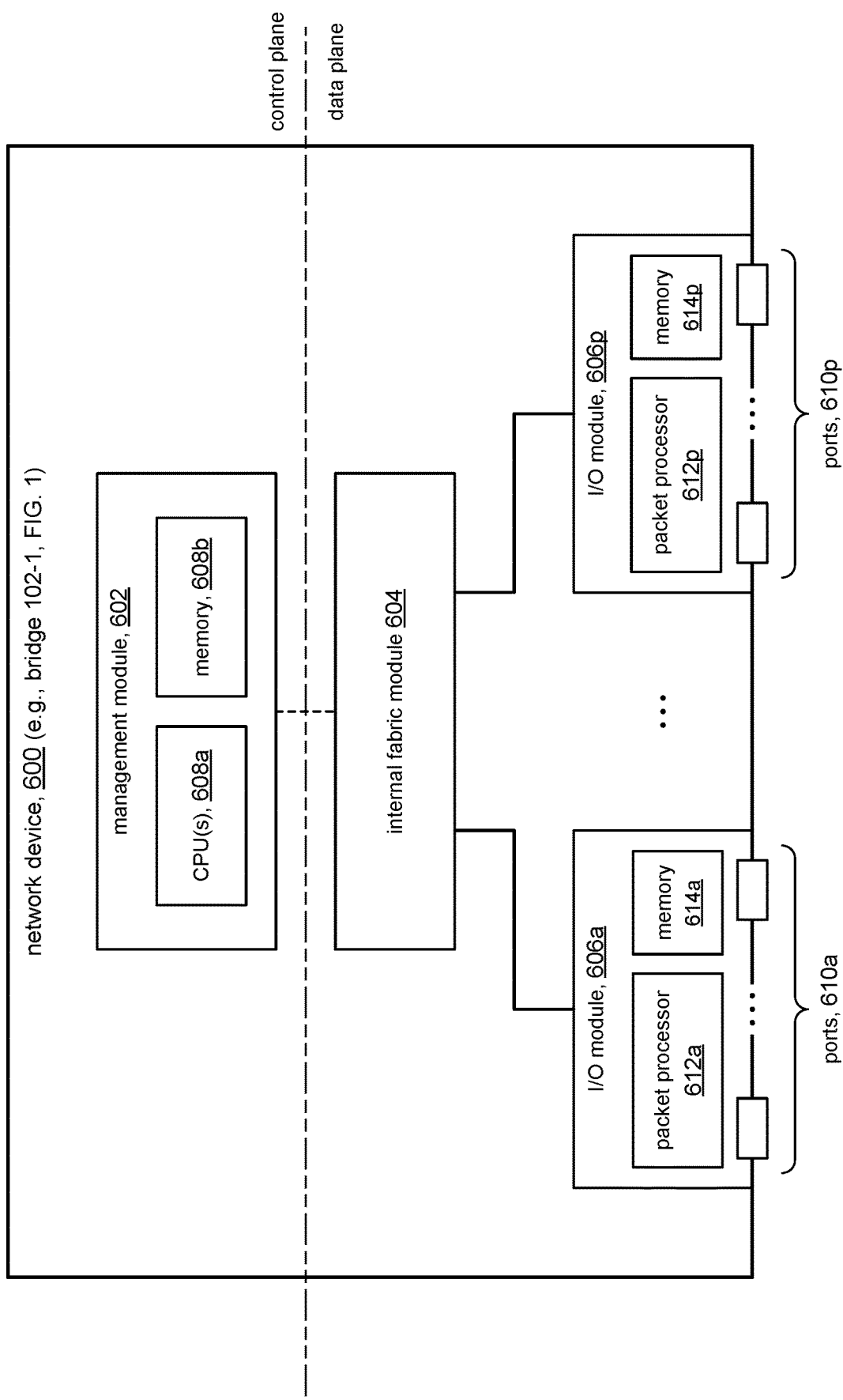
FIG. 6 shows an illustrative network device that can be adapted in accordance with the present disclosure.

FIG. 6 depicts an example of a network device 600 (e.g. bridge 102-1, FIG. 1) in accordance with some embodiments of the present disclosure. As shown, network device 600 can include a management module 602, an internal fabric module 604, and one or more I/O modules 606a-606p. Management module 602 constitutes the control plane (also referred to as the control layer) of network device 600 and can include one or more management CPUs 608a for managing and controlling operation of network device 600 in accordance with the present disclosure. Management CPU 608a can be a general purpose processor, such as but not limited to an Intel®/AMD® x86 or ARM® processor, that operates under the control of software stored in a memory 608b, such as dynamic random access memory (DRAM). The control plane provides processes to determine which path to use, such as routing protocols, spanning tree learning (STP engine), and the like.

Internal fabric module 604 and I/O modules 606a-606p collectively represent the data plane of network device 600 (also referred to as the data layer, forwarding plane, etc.). Internal fabric module 604 serves to interconnect the various other modules of network device 600. Each I/O module 606a-606p includes one or more input/output ports 610a-610p that are used by network device 600 to send and receive network packets. Each I/O module 606a-606p can also include packet processing capability, logically represented by respective packet processors 612a-612p and memory components 614a-614p. Each packet processor 612a-612p can comprise a forwarding hardware component, comprising for example, data processing elements such as an application specific integrated circuit (ASIC), field programmable array (FPGA), digital processing unit, content-addressable memory, and the like. The forwarding hardware component can be configured to make wire speed decisions on how to handle incoming (ingress) and outgoing (egress) network packets. In accordance with some embodiments some aspects of the present disclosure can be performed wholly within the data plane. In accordance with the present disclosure, the memory components can hold information for processing in accordance with the present disclosure.

Further Examples

Features described above as well as those claimed below may be combined in various ways without departing from the scope hereof. The following examples illustrate some possible, non-limiting combinations:

(A1) A method in a network device in a network, the method comprising: initiating a software upgrade in the network device; subsequent to initiating the software upgrade, starting a timer to mark a beginning of a quiescent period; disabling transmission of bridge protocol data units (BPDUs) to other network devices in the network, wherein the network device does not transmit BPDUs to other network devices during the quiescent period; initiating spanning tree protocol (STP) processing; receiving first BPDUs from the other network devices during the quiescent period; updating port information of ports of the network device based on the first BPDUs without transmitting any BPDUs to the other network devices during the quiescent period; and subsequent to expiration of the timer: enabling transmission of BPDUs to other network devices in the network; receiving second BPDUs from the other network devices; and updating port information of ports of the network device based on the second BPDUs, including transmitting BPDUs to the other network devices for at least some of the second BPDUs.

(A2) For the method denoted as (A1), the STP processing during the quiescent period excludes a root bridge election sequence.

(A3) For the method denoted as any of (A1) through (A2), the method further comprises determining that a spanning tree topology defined by STP processing is stable prior to performing the software upgrade.

(A4) For the method denoted as any of (A1) through (A3), the method further comprises, subsequent to expiration of the timer, generating a BPDU and transmitting the generated BPDU in response to one of the second BPDUs indicating presence of a designated non-edge port as a result of a change in topology.

(A5) For the method denoted as any of (A1) through (A4), the network device comprises (1) ports whose operational states are only to receive BPDUs or (2) edge ports that have a port role of designated port.

(A6) For the method denoted as any of (A1) through (A5), wherein updating port information includes updating port role and/or port state information of the ports of the network device based on the received first BPDUs.

(A7) For the method denoted as any of (A1) through (A6), wherein a spanning tree topology of the network prior to initiating the software upgrade does not change during the software upgrade.

(B1) A network device comprising: one or more computer processors; and a computer-readable storage medium, the computer-readable storage medium comprising instructions for controlling the one or more computer processors to: initiate a software update in the network device; start spanning tree protocol (STP) processing in response to initiating the software update; and receive bridge protocol data units (BPDUs) during a quiescent period of time that begins subsequent to starting STP processing, including updating port role and port state information of ports on the network device based on the received BPDUs, wherein the network device does not transmit BPDUs during the quiescent period in response to any of the received BPDUs.

(B2) For the network device denoted as (B1), the computer-readable storage medium further comprises instructions for controlling the one or more computer processors to receive BPDUs subsequent to an end of the quiescent period, including updating the port role and port state information of the ports on the network device based on the subsequently received BPDUs, wherein the network device transmits BPDUs in response to one or more of the subsequently received BPDUs.

(B3) For the network device denoted as any of (B1) through (B2), wherein the network device does not perform a root bridge election sequence upon starting STP processing.

(B4) For the network device denoted as any of (B1) through (B3), wherein the network device comprises (1) ports whose operational states are only to receive BPDUs or (2) edge ports that have a port role of designated port.

(B5) For the network device denoted as any of (B1) through (B4), wherein the computer-readable storage medium further comprises instructions for controlling the one or more computer processors to start a timer which represents a beginning of the quiescent period, wherein expiration of the timer represents the end of the quiescent period.

(B6) For the network device denoted as any of (B1) through (B5), wherein the computer-readable storage medium further comprises instructions for controlling the one or more computer processors to determine that a spanning tree topology defined by STP processing is stable prior to initiating the software upgrade.

(B7) For the network device denoted as any of (B1) through (B6), wherein the software upgrade occurs in a control plane of the network device, wherein processing of network traffic continues in a data plane of the network device during the software upgrade.

(C1) A method in a network device, the method comprising: starting a spanning tree protocol (STP) process that does not include a root bridge election sequence; during a quiescent period after starting the STP process, receiving and processing bridge protocol data units (BPDUs) without transmitting any BPDUs in response to the BPDUs received during the quiescent period; and subsequent to termination of the quiescent period, receiving and processing bridge protocol data units (BPDUs), including transmitting BPDUs in response to one or more of the BPDUs received subsequent to termination of the quiescent period.

(C2) For the method denoted as (C1), the method further comprises initiating a software update prior to starting the STP process, wherein starting the STP process is part of the software update.

(C3) For the method denoted as any of (C1) through (C2), the method further comprises starting a timer to initiate the quiescent period, wherein expiration of the timer represents the termination of the quiescent period.

(C4) For the method denoted as any of (C1) through (C3), wherein the quiescent period is based on an STP maximum age value.

(C5) For the method denoted as any of (C1) through (C4), the method further comprises determining that a spanning tree topology defined by STP processing is stable prior to starting the STP process.

(C6) For the method denoted as any of (C1) through (C5), wherein the STP process executes in a control plane of the network device, wherein processing of network traffic continues in a data plane of the network device during the software upgrade.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device in a network, the method comprising:
   initiating a software upgrade in the network device;
   subsequent to initiating the software upgrade, starting a timer to mark a beginning of a quiescent period;
   disabling transmission of bridge protocol data units (BPDUs) to other network devices in the network, wherein the network device does not transmit BPDUs to other network devices during the quiescent period;
   initiating spanning tree protocol (STP) processing;
   receiving first BPDUs from the other network devices during the quiescent period;
   updating port information of ports of the network device based on the first BPDUs without transmitting any BPDUs to the other network devices during the quiescent period; and
   subsequent to expiration of the timer:
      enabling transmission of BPDUs to other network devices in the network;
      receiving second BPDUs from the other network devices; and
      updating port information of ports of the network device based on the second BPDUs, including transmitting BPDUs to the other network devices for at least some of the second BPDUs.

2. The method of claim 1, wherein the STP processing during the quiescent period excludes a root bridge election sequence.

3. The method of claim 1, further comprising determining that a spanning tree topology defined by STP processing is stable prior to performing the software upgrade.

4. The method of claim 1, further comprising, subsequent to expiration of the timer, generating a BPDU and transmitting the generated BPDU in response to one of the second BPDUs indicating presence of a designated non-edge port as a result of a change in topology.

5. The method of claim 1, wherein the network device comprises (1) ports whose operational states are only to receive BPDUs or (2) edge ports that have a port role of designated port.

6. The method of claim 1, wherein updating port information includes updating port role and/or port state information of the ports of the network device based on the received first BPDUs.

7. The method of claim 1, wherein a spanning tree topology of the network prior to initiating the software upgrade does not change during the software upgrade.

8. A network device comprising:
   one or more computer processors; and
   a computer-readable storage medium comprising instructions for controlling the one or more computer processors to:
      initiate a software update in the network device;
      start spanning tree protocol (STP) processing in response to initiating the software update; and
      receive bridge protocol data units (BPDUs) during a quiescent period of time that begins subsequent to starting STP processing, including updating port role and port state information of ports on the network device based on the received BPDUs, wherein the network device does not transmit BPDUs during the quiescent period in response to any of the received BPDUs.

9. The network device of claim 8, wherein the computer-readable storage medium further comprises instructions for controlling the one or more computer processors to receive BPDUs subsequent to an end of the quiescent period, including updating the port role and port state information of the ports on the network device based on the subsequently received BPDUs, wherein the network device transmits BPDUs in response to one or more of the subsequently received BPDUs.

10. The network device of claim 8, wherein the network device does not perform a root bridge election sequence upon starting STP processing.

11. The network device of claim 8, wherein the network device comprises (1) ports whose operational states are only to receive BPDUs or (2) edge ports that have a port role of designated port.

12. The network device of claim 8, wherein the computer-readable storage medium further comprises instructions for controlling the one or more computer processors to start a timer which represents a beginning of the quiescent period, wherein expiration of the timer represents the end of the quiescent period.

13. The network device of claim 8, wherein the computer-readable storage medium further comprises instructions for controlling the one or more computer processors to determine that a spanning tree topology defined by STP processing is stable prior to initiating the software upgrade.

14. The network device of claim 8, wherein the software upgrade occurs in a control plane of the network device, wherein processing of network traffic continues in a data plane of the network device during the software upgrade.

15. A method in a network device, the method comprising:
   starting a spanning tree protocol (STP) process that does not include a root bridge election sequence;
   during a quiescent period after starting the STP process, receiving and processing bridge protocol data units (BPDUs) without transmitting any BPDUs in response to the BPDUs received during the quiescent period; and
   subsequent to termination of the quiescent period, receiving and processing bridge protocol data units (BPDUs), including transmitting BPDUs in response to one or more of the BPDUs received subsequent to termination of the quiescent period.

16. The method of claim 15, further comprising initiating a software update prior to starting the STP process, wherein starting the STP process is part of the software update.

17. The method of claim 15, further comprising starting a timer to initiate the quiescent period, wherein expiration of the timer represents the termination of the quiescent period.

18. The method of claim 15, wherein the quiescent period is based on an STP maximum age value.

19. The method of claim 15, further comprising determining that a spanning tree topology defined by STP processing is stable prior to starting the STP process.

20. The method of claim 15, wherein the STP process executes in a control plane of the network device, wherein processing of network traffic continues in a data plane of the network device during the software upgrade.

\* \* \* \* \*